United States Patent
Lee et al.

(10) Patent No.: US 9,743,356 B2
(45) Date of Patent: Aug. 22, 2017

(54) METHOD AND APPARATUS FOR SUPPORTING STATE MODE TRANSITION OR PERFORMING STATE MODE TRANSITION IN PLURAL COMMUNICATION SYSTEM CONVERGENCE NETWORKS

(71) Applicant: LG ELECTRONICS INC., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 14/758,896

(22) PCT Filed: Jan. 22, 2014

(86) PCT No.: PCT/KR2014/000617
§ 371 (c)(1),
(2) Date: Jul. 1, 2015

(87) PCT Pub. No.: WO2014/116021
PCT Pub. Date: Jul. 31, 2014

(65) Prior Publication Data
US 2015/0358909 A1    Dec. 10, 2015

Related U.S. Application Data

(60) Provisional application No. 61/757,677, filed on Jan. 28, 2013.

(51) Int. Cl.
*H04L 1/00* (2006.01)
*H04W 52/02* (2009.01)
(Continued)

(52) U.S. Cl.
CPC ......... *H04W 52/0235* (2013.01); *H04L 69/28* (2013.01); *H04W 52/0206* (2013.01);
(Continued)

(58) Field of Classification Search
CPC ................................................. H04W 52/0235
(Continued)

(56) References Cited

U.S. PATENT DOCUMENTS

2008/0167054 A1* 7/2008 Shaheen ............... H04W 60/04
455/458
2009/0098884 A1   4/2009 Casati et al.
(Continued)

FOREIGN PATENT DOCUMENTS

EP    2056628 A1    5/2009

*Primary Examiner* — Shripal Khajuria
(74) *Attorney, Agent, or Firm* — Birch, Stewart, Kolasch & Birch, LLP

(57) ABSTRACT

A method is provided for supporting state mode transition by an entity of a cellular network in case that a plurality of networks interwork. When a value of interference caused by a neighbor entity of a wireless local area network (WLAN) is equal to or larger than a predefined threshold value, a first message instructing another entity of the WLAN to perform a mode transition from an active mode to an idle mode is transmitted to another entity of the WLAN. In response, a second message including information indicating whether status of the mode transition of the another entity of the WLAN is successful is received from the another entity of the WLAN. When the information indicates that the status of the mode transition of the another entity of the WLAN is successful, status information of the another entity of the WLAN is updated based on the second message.

7 Claims, 5 Drawing Sheets

(51) Int. Cl.
*H04W 76/04* (2009.01)
*H04L 29/06* (2006.01)
*H04W 84/12* (2009.01)
*H04W 24/02* (2009.01)
*H04W 88/06* (2009.01)

(52) U.S. Cl.
CPC ..... *H04W 52/0229* (2013.01); *H04W 76/046* (2013.01); *H04W 24/02* (2013.01); *H04W 84/12* (2013.01); *H04W 88/06* (2013.01); *Y02B 60/50* (2013.01)

(58) Field of Classification Search
USPC .......................................................... 370/329
See application file for complete search history.

(56) References Cited

U.S. PATENT DOCUMENTS

| | | |
|---|---|---|
| 2010/0081454 A1 | 4/2010 | Wang et al. |
| 2010/0151852 A1 | 6/2010 | Mori et al. |
| 2012/0106349 A1 | 5/2012 | Adjakple et al. |
| 2013/0065585 A1* | 3/2013 | Pelletier .............. H04W 4/02 455/435.1 |
| 2013/0072196 A1* | 3/2013 | Jung .................... H04W 36/30 455/437 |

\* cited by examiner

METHOD AND APPARATUS FOR SUPPORTING STATE MODE TRANSITION OR PERFORMING STATE MODE TRANSITION IN PLURAL COMMUNICATION SYSTEM CONVERGENCE NETWORKS

CROSS REFERENCE TO RELATED APPLICATIONS

This application is the National Phase of PCT/KR2014/000617 filed on Jan. 22, 2014, which claims priority under 35 U.S.C. 119(e) to U.S. Provisional Application No. 61/757,677 filed on Jan. 28, 2013, all of which are hereby expressly incorporated by reference into the present application.

TECHNICAL FIELD

The present invention relates to wireless communication, and more particularly to a method and apparatus for supporting state mode transition or performing state mode transition in a plurality of communication system convergence networks.

BACKGROUND ART

There is a multi-RAT user equipment (UE) having capability in which the multi-RAT UE can access two or more radio access technologies (RATs). In order to access a specific RAT, connection to a specific RAT can be established on the basis of a UE request, and data transmission/reception can be achieved on the basis of the UE request.

However, although the multi-RAT UE has the capability to access two or more RATs, the multi-RAT UE cannot simultaneously access multiple RATs. In other words, although a current UE has multi-RAT capability, the UE cannot simultaneously transmit and receive data through different RATs.

The conventional multi-RAT technology need not perform interworking between a WLAN and a cellular network, such that overall system efficiency is low. However, a method for solving such low system efficiency has not yet been researched and discussed.

DISCLOSURE

Technical Problem

An object of the present invention is to provide a method for supporting state mode transition by an entity of a first communication system in a plurality of communication system convergence networks.

An object of the present invention is to provide a device of a first communication system configured to support state mode transition in a plurality of communication system convergence networks.

An object of the present invention is to provide a method for performing state mode transition by an entity of a first communication system in a plurality of communication system convergence networks.

An object of the present invention is to provide a device of a first communication system configured to perform state mode transition in a plurality of communication system convergence networks.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for supporting state mode transition by an entity of a first communication system in a convergence network of a plurality of communication systems, the method including: if a triggering condition for triggering transition between an active mode and an idle mode is satisfied, transmitting a first message indicating state mode transition to an entity of a second communication system; receiving a second message including specific information indicating whether the state mode transition is successful from the entity of the second communication system, in response to the first message; and updating status information of the entity of the second communication system on the basis of the second message, wherein the first and second communication systems are heterogeneous communication systems for each other. Under the condition that the triggering condition indicates transition from the active mode to the idle mode, the triggering condition may represent a first case wherein interference from a neighbor access point (AP) is equal to or higher than a predetermined threshold value, a second case wherein a user of the entity of the second communication system is not present, or a third case wherein a current time enters a specific time zone in which the number of users who use the entity of the second communication system is equal to or less than a predetermined threshold value. Under the condition that the triggering condition indicates transition from the idle mode to the active mode, the triggering condition may represent a first case wherein a different entity causing interference of higher than a predetermined threshold value to the entity of the second communication system is turned off, or may represent a second case wherein a specific user connects to the entity of the second communication system or a current time enters a specific time zone in which the number of users who use the entity of the second communication system is equal to or higher than a predetermined threshold value. The first communication system may be a cellular network, and the second communication system may be a wireless LAN (WLAN). The entity of the first communication system may be a base station (BS) (or eNB), a Mobility Management Entity (MME), or an Interworking Management Entity (IWME). The entity of the second communication system may be an access point (AP). The first message may start to operate a timer when the triggering condition is satisfied so that the first message is transmitted after the timer has expired.

In accordance with another aspect of the present invention, a apparatus for use in a first communication system configured to support state mode transition in a plurality of communication system convergence networks includes: a transmitter, if a triggering condition for triggering transition between an active mode and an idle mode is satisfied, configured to transmit a first message indicating state mode transition to an entity of a second communication system; a receiver configured to receive a second message including specific information indicating whether the state mode transition is successful from the entity of the second communication system, in response to the first message; and a processor configured to update status information of the entity of the second communication system on the basis of the second message, wherein the first and second communication systems are heterogeneous communication systems for each other. The receiver may be configured to receive the first message when the triggering condition is satisfied after expiration of a timer.

In accordance with another aspect of the present invention, a method for performing state mode transition by an entity of a first communication system in a convergence network of a plurality of communication systems includes: if a triggering condition for triggering transition between an active mode and an idle mode is satisfied, receiving a first message indicating state mode transition from an entity of a second communication system; performing state mode transition in response to an indication message of the first message; and transmitting a second message including specific information indicating whether the state mode transition is successful to the entity of the second communication system, in response to the first message, wherein the first and second communication systems are heterogeneous communication systems for each other. The method may further include: transmitting an indication message indicating whether the state mode transition is successful to a user equipment (UE) of the second communication system. The second communication system may be a cellular network, and the first communication system may be a wireless LAN (WLAN).

In accordance with another aspect of the present invention, a apparatus for use in a first communication system configured to perform state mode transition in a plurality of communication system convergence networks includes: a receiver, if a triggering condition for triggering transition between an active mode and an idle mode is satisfied, configured to receive a first message indicating state mode transition from an entity of a second communication system; a processor configured to perform state mode transition in response to an indication message of the first message; and a transmitter configured to transmit a second message including specific information indicating whether the state mode transition is successful to the entity of the second communication system, in response to the first message, wherein the first and second communication systems are heterogeneous communication systems for each other. The transmitter may be configured to transmit an indication message indicating whether the state mode transition is successful to a user equipment (UE) of the second communication system. The device of the first communication system may be an access point (AP).

Advantageous Effects

As is apparent from the above description, in order to efficiently use a WLAN by a user equipment (UE) through control of a cellular network in a broadband wireless communication system, exemplary embodiments of the present invention provide a method for minimizing power consumption of an Access Point (AP) having a cellular link or minimizing interference between APs, resulting in improvement of communication throughput.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
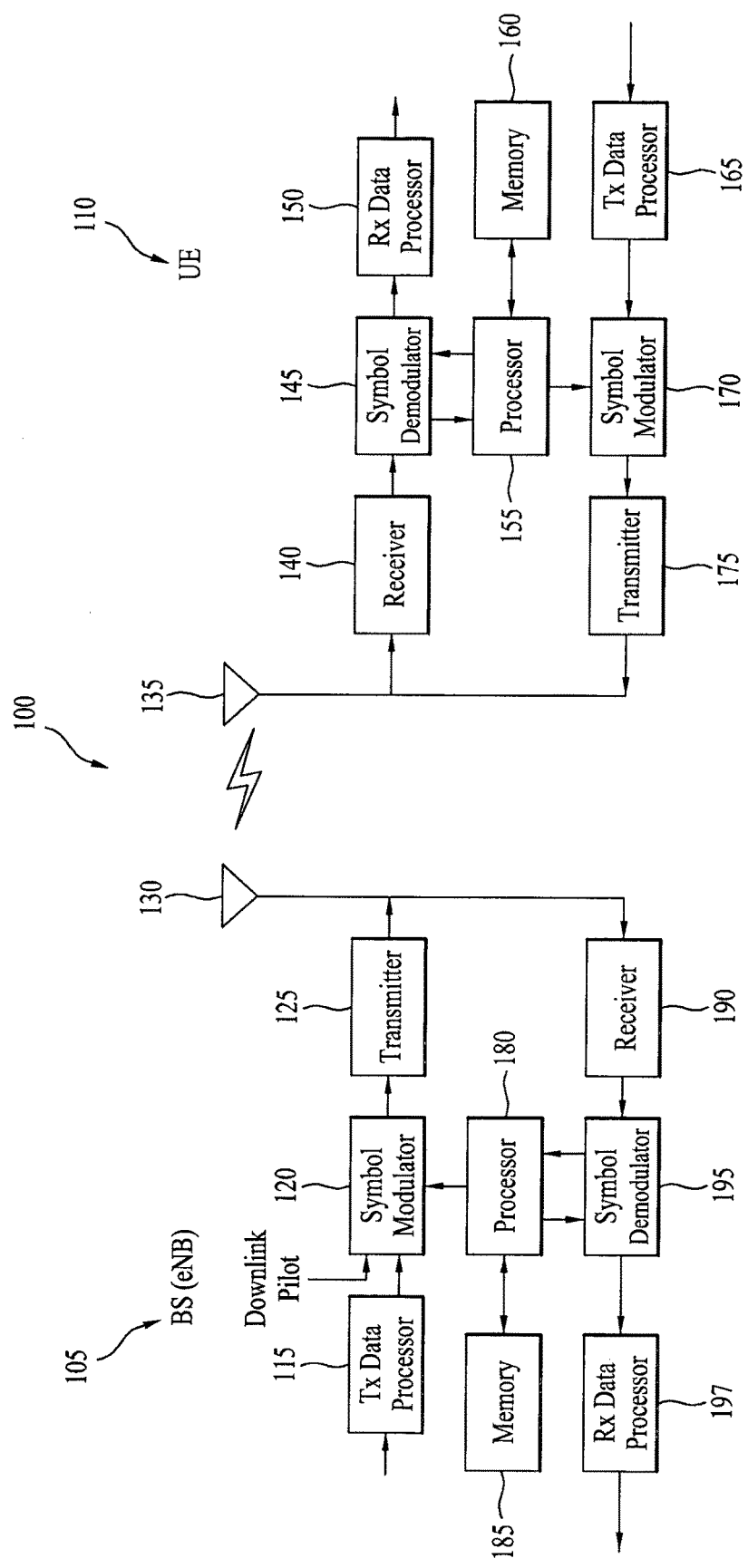
FIG. 1 is a block diagram illustrating a base station (BS) and a user equipment (UE) for use in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like. The term "UE" for use in the present invention may also be referred to as a Machine to Machine (M2M) terminal or a Human Type Communication (HTC) terminal.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating a base station (BS) 105 and a user equipment (UE) 110 for use in a wireless communication system 100 according to the present invention.

Although FIG. 1 shows one UE 105 and one UE 110 (including a D2D UE) for brief description of the wireless communication system 100, it should be noted that the wireless communication system 100 may further include one or more BSs and/or one or more UEs.

Referring to FIG. 1, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 1, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

While the UE processor 155 enables the UE 110 to receive signals and can process other signals and data, and the BS processor 180 enables the BS 105 to transmit signals and can process other signals and data, the processors 155 and 180 will not be specially mentioned in the following description. Although the processors 155 and 180 are not specially mentioned in the following description, it should be noted that the processors 155 and 180 can process not only data transmission/reception functions but also other operations such as data processing and control.

Conventional inter RAT technology is designed based on a UE request, and does not require interworking between a WLAN and a cellular network. In the conventional inter RAT technology, a specific network server manages WLAN information and facilitates inter RAT handover according to a UE request. In addition, although UEs can simultaneously access Multiple RATs, only flow mobility/IP-flow mapping at a network level can be supported without control of a radio level, such that the UEs can simultaneously access Multiple RATs. For this reason, according to the conventional art, control connection between the AP and the cellular network is not requested and proceeds based on a UE request. However, in order to increase overall network efficiency using the multi-RAT, it is necessary to provide network based tightly coupled management technology instead of a request of the UE. Direct control connection between different RATs is established. Thus, more efficient and rapid inter-RAT interworking needs to be performed.

A control entity of multiple RATs to increase energy efficiency of an overall system may turn on or off Tx/Rx power of a specific RAT under a specific environment, or may need to control a status transition of an access point (AP) of a specific RAT. In addition, under an AP jamming environment, interference mitigation between the APs needs to be controlled by a multiple RAT management entity.

In order to enable a UE to efficiently use a WLAN by controlling a cellular network in a broadband wireless communication system, a method for minimizing power consumption of an AP having a cellular link or minimizing interference between APs is proposed.

A network structure in which multiple communication systems are interoperable with each other will hereinafter be described in detail.

Figure 2:
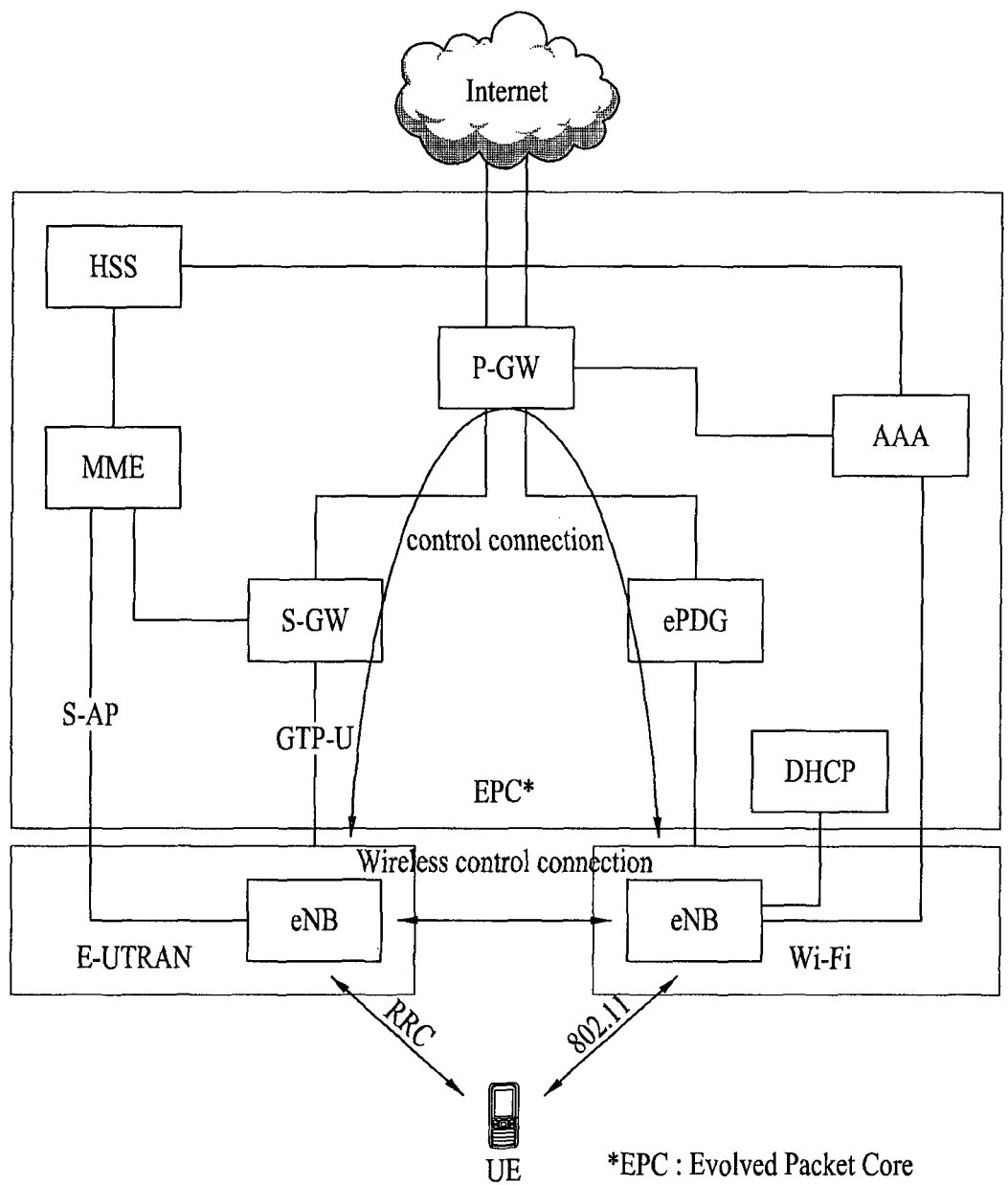
FIG. 2 is a conceptual diagram illustrating a network structure for explaining an interworking structure between a first communication system (e.g., LTE system) and a second communication system (e.g., Wi-Fi system).

FIG. 2 is a conceptual diagram illustrating a network structure for explaining an interworking structure between a first communication system (e.g., LTE system) and a second communication system (e.g., Wi-Fi system).

As can be seen from the network structure of FIG. 2, a backhaul control connection may be present between an AP and an eNB through a backbone network (e.g., P-GW or Evolved Packet Core (EPC)), or a wireless control connection may be present between the AP and the eNB. For peak throughput and data traffic offloading, the UE may simultaneously support a first communication system (or a first communication network) configured to use a first wireless communication scheme and a second communication system (or a second communication network) configured to use a second wireless communication scheme through interworking between a plurality of communication networks. In this case, the first communication network may be referred to as a primary network, and the first communication system may be referred to as a primary system. The second communication network may be referred to as a secondary network, and the second communication system may be referred to as a secondary system. For example, the UE may be configured to simultaneously support an LTE (or LTE-A) system and a Wi-Fi system (Near Field Communication (NFC) system such as WLAN/802.11). The above-mentioned UE may also be referred to as a multi-system capability UE.

In the network structure shown in FIG. 2, the primary system has wider coverage, and may be a network for transmitting control information. WiMAX or LTE (LTE-A) system may be used as an example of the primary system. Meanwhile, a secondary system has a network having small coverage, and may be a system for data transmission. For example, the secondary system may be a WLAN or Wi-Fi system.

The present invention assumes the following items, and a detailed description thereof will hereinafter be described in detail.

It is assumed that an entity for managing interworking is an entity contained in a cellular network, and an interworking function is implemented in the following three entities.

e-NB—Reuse existing entity

Mobility Management Entity (MME)—Reuse existing entity

InterWorking Management Entity (IWME)—Define new entity

The interworking function is associated with an interworking-related procedure between the eNB and the UE or between the eNB and the AP, an entity for managing interworking may store and/or manage AP information. The eNB, MME, and/or IWME may store/manage information of APs covered thereby. It is assumed that the relationship between the access point (AP) of the secondary system (e.g., Wi-Fi) and the eNB (or MME or IWME) acting as an AP of the primary system (e.g., LTE or WiMAX) is denoted by control connection.

Method 1: Wired Control Connection

New interface is established through a backbone network.

Method 2: Wireless Control Connection

In a technical idea of the present invention, an AP having an air interface relationship with the eNB is referred to as an eAP.

That is, the eAP must support not only 802.11 MAC/PHY but also the LTE protocol stack for communication with the eNB, may serve as the same role as an LTE UE in association with the eNB, and may communicate with the eNB.

Figure 3:
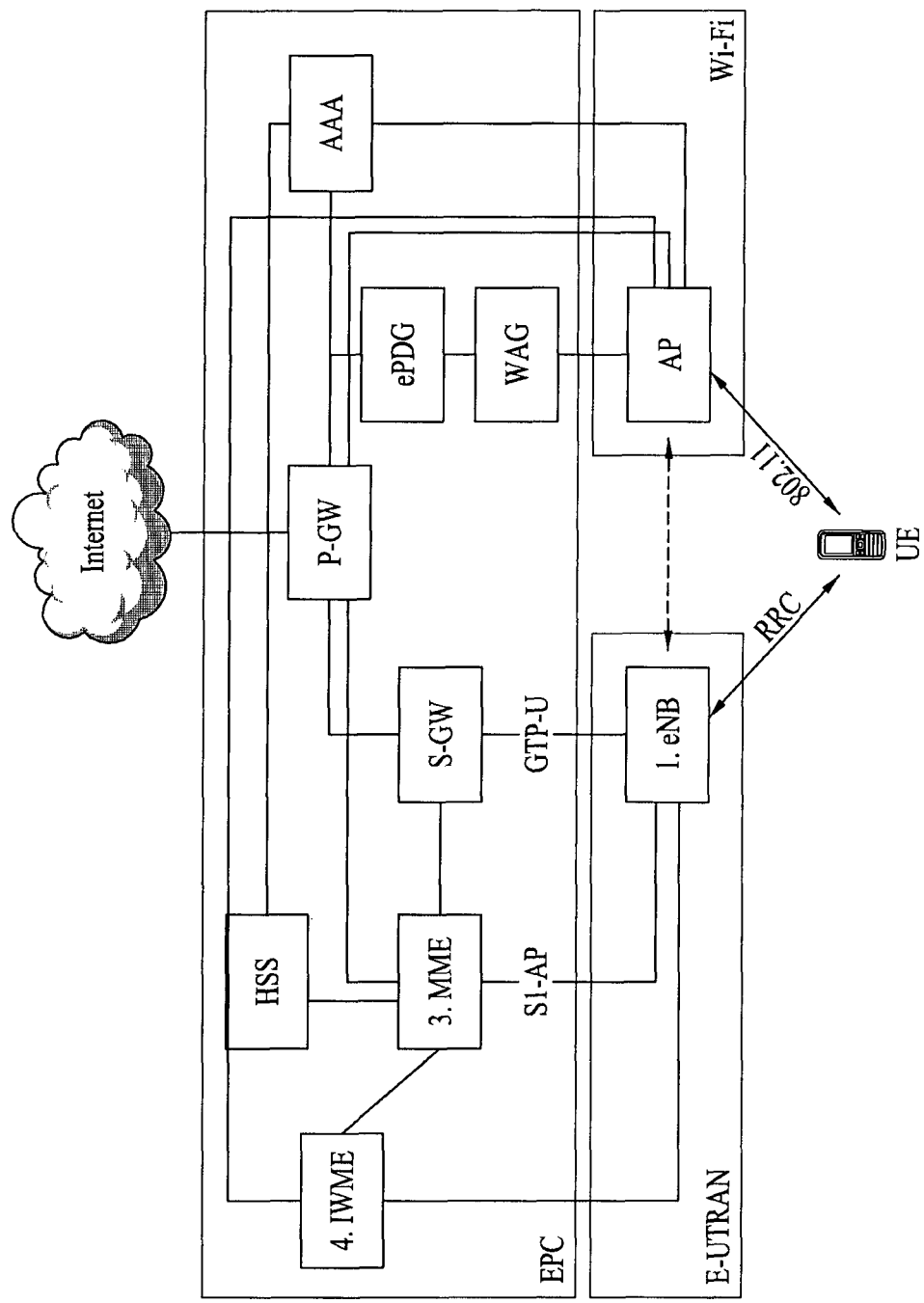
FIG. 3 is a conceptual diagram illustrating a network structure of Wi-Fi-Cellular interworking according to embodiments of the present invention.

FIG. 3 is a conceptual diagram illustrating a network structure of Wi-Fi-Cellular interworking according to embodiments of the present invention.

According to technology of the present invention, in order to enable a dual-mode UE to more efficiently use a Wi-Fi cellular convergence network under the environment in which there is a UE capable of simultaneously transmitting/receiving a Wi-Fi network and a cellular network, a dual mode UE, the cellular network can manage information of the AP according to the following four methods (Method 1~Method 4).

Method 1: Use of Air Interface Between eNB and AP

In Method 1, the eNB may control an AP using a wireless control connection to the AP in a similar way to a general UE.

Method 2: Use of Backhaul Interface Between eNB and AP

In Method 2, the eNB may control an AP using a wired control connection to the AP.

Method 3: Use of Control Interface Between MME and AP

In Method 3, an AP may be controlled using control connection between MME and AP (i.e., secondary system).

Method 4: Use of Control Interface Between IWME and AP

In Method 4, an AP can be controlled using control connection between IWME and AP (i.e., secondary system).

A new AP status transition method for implementing power saving of the AP and increasing energy efficiency of a system is defined, and a detailed description thereof will hereinafter be described in detail.

[AP Status Definitions]

A status of an AP proposed by the present invention may be switched by control of a cellular network, and the present invention proposes two AP statuses (e.g., an AP active mode and an AP idle mode). In the active mode, the AP may periodically transmit a beacon signal in order to inform a UE of the presence of the AP, and may communicate with the UE. In the idle mode, the AP may stop transmission of a beacon signal, may not communicate with the UE, and may maintain only control connection to a backhaul network (if there is an air interface between the eNB and the AP, a wireless backhaul may be provided).

[AP Status Transition Conditions]

The AP status proposed by the present invention may be switched when the following condition is satisfied.

Switching or transition may be carried out by explicit signaling transmitted from an interworking-associated entity of the cellular network. Alternatively, transition may be carried out by a timer according to the implicit signaling method, and it is necessary for the AP to inform the interworking-associated entity of the cellular network of status information of the AP.

Embodiment 1: Definition of Explicit Signaling for AP Status Transition (i.e., Transition from Active Mode to Idle Mode)

AP status transition Trigger conditions (i.e., transitions from an active mode to an idle mode) are classified into three AP status trigger conditions (1), (2), and (3). In the first AP status trigger condition (1), if there is high interference between one AP and a neighbor AP (e.g., in case of a public AP), i.e., if interference from the neighbor AP is equal to or higher than a predetermined threshold value, an AP status transition may occur. In the second AP status trigger condition (2), if a user of a specific AP is not present (e.g., in case of a private AP), an AP status transition may occur. In the third AP status trigger condition (3), if a current time enters a time zone having few users (e.g., in case of a public AP), an AP status transition may occur. That is, if a current time enters a time zone in which the number of users is equal to or less than a predetermined threshold value, an AP status transition may occur.

If any one of the AP status transition trigger conditions is satisfied, an IWE may inform a specific AP of transition through signaling according to the present invention. However, if any one of the AP status transition trigger conditions is satisfied, an eNB or MME acting as an entity of a conventional cellular network may inform a specific AP of transition through signaling.

1) Trigger condition when there is high interference between one AP and the neighbor AP (e.g., in case of a public AP) assumes that the AP periodically transmits an interference measurement value between the neighbor APs to an Interworking Management Entity (e.g., eNB, MME or IWME) of the cellular network, and an IME has already recognized the corresponding information. If interference between the APs is higher than a specific value according to a policy of the cellular network, the IWE may command a specific AP to be turned off. 2) Trigger condition when there is no user of a specific AP (e.g., in case of a private AP) assumes that an IME has already recognized information of a user (UE) who uses a specific AP managed by the IME. If a user of a specific AP pre-registered in coverage of the IME is not present, the IME may command the corresponding AP to turn off. 3) According to a trigger condition under a specific time zone having few users (e.g., in case of a public case), if the AP is used for data traffic offloading, and if the number of users (UEs) contained in a specific coverage of the cellular network is less than a threshold value, the IME may command a specific AP to be turned off.

Transmission of AP Status Message (e.g., AP_STATUS Message)

If any one of the above-mentioned three trigger conditions is satisfied, the IME transmits an AP status message (e.g., AP_STATUS message) to a specific AP such that the IME may command the AP to enter an idle mode. The AP status message (e.g., AP_STATUS message) may include the following parameters.

Action code—Sleep

Action cause—high interference/no user/night time

Other parameters may be contained in an action cause. For example, in the cause of "night time", i.e., in the case of a triggering condition when a current time enters a specific time zone having few users, the IME transmits an AP_STATUS message so that the AP is turned off. In this case, a timer value is contained in the AP_STATUS message, and the resultant AP_STATUS message is transmitted. Thereafter, if a timer has expired without additional signaling, the IME may command the AP to turn on.

Reception of AP Status Message (e.g., AP_STATUS Message)

The AP having received the AP status message (e.g., AP_STATUS message) from the IME may be switched from the active mode to the idle mode according to an action code. Thereafter, if a current status of the AP is well switched according to an action code, an AP_STATUS_ACK message indicating the switching result is transmitted to the IME, such that a status "success" or "fail" may be indicated as the action result.

Embodiment 2: Definition of Explicit Signaling for AP Status Transition (i.e., Transition from Active Mode to Idle Mode)

Trigger conditions for transition from the idle mode to the active mode are classified into three trigger conditions (1), (2), and (3). In the first trigger condition (1), if an AP that causes interference to a neighbor AP is turned off, or if interference between one AP and the neighbor AP is acceptable (e.g., in case of a public AP), an AP status transition may occur. In the second trigger condition (2), if a user of a specific AP gains access to the corresponding cell (e.g., in case of a private AP), an AP status transition may occur. In the third trigger condition (3), if a current time enters a time zone having an increased number of users (e.g., in case of a public AP), i.e., if a current time enters a time zone in which the number of users is equal to or higher than a predetermined threshold value, an AP status transition may occur.

1) If an AP that causes interference to a neighbor AP is turned off, or if interference between one AP and the neighbor AP is acceptable (e.g., in case of a public AP), it is assumed that the AP periodically transmits an interference measurement value between the AP and the neighbor AP to an Interworking Management Entity (e.g., eNB, MME or IWME) of the cellular network, and the IME has already recognized the corresponding information. If interference between APs causes no influence according to a policy of the cellular network, the IWE may command a specific AP to be turned on. 2) An exemplary case in which a user of a specific AP gains access to the corresponding cell (e.g., in case of a private AP) assumes that an IME has already recognized information of a user (UE) who uses a specific AP managed by the IME. If at least one user of a specific AP pre-registered in coverage of the IME connects to the corresponding cell, the IME may command the corresponding AP to be turned on. 3) If a current time enters a specific time zone having an increasing number of users (e.g., in case of a public case), if the AP is used for data traffic offloading, and if the number of users (UEs) contained in a specific coverage of the cellular network is equal to or higher than a threshold value, the IME may command a specific AP to turn on.

Transmission of AP Status Message (e.g., AP_STATUS Message)

If any one of the above-mentioned three trigger conditions for transition from the idle mode to the active mode is satisfied, the IME transmits an AP_STATUS message to a specific AP such that the IME may command the AP to enter an idle mode. The AP_STATUS message may include the following parameters.

Action code—Awake

In case of an awake mode, the IME may transmit a period of a beacon signal of the AP. If Tx power intensity or channel information is not separately transmitted for interference reduction, the Tx power intensity, the channel information, etc. may be simultaneously transmitted. If one or more channels can be provided, one or more lists may be transmitted.

Action cause—acceptable interference/user entrance/Day Time

Other parameters may be contained in an action cause. For example, if the AP is turned on due to "user entrance", user information is also transmitted, and user authentication can be quickly performed. Alternatively, in the causes of "acceptable interference", channel information and a Tx power value to be used when the AP is turned on may be simultaneously transmitted to minimize interference between the AP and the neighbor AP. If necessary, not only the channel information and Tx power value but also other information may be transmitted. In more detail, one or more information may be transmitted as necessary.

Reception of AP Status Message (e.g., AP_STATUS Message)

The AP having received the AP_STATUS message from the IME may be switched from the active mode to the idle mode according to an action code. If status transition occurs, the AP may broadcast a beacon signal and may communicate with a UE configured to transmit a connection request to the AP. If a status of the AP is transitioned to according to an action code, an AP_STATUS_ACK message indicating the result of transition is transmitted to the IME, such that a status "success" or "fail" may be indicated as the action result.

Figure 4:
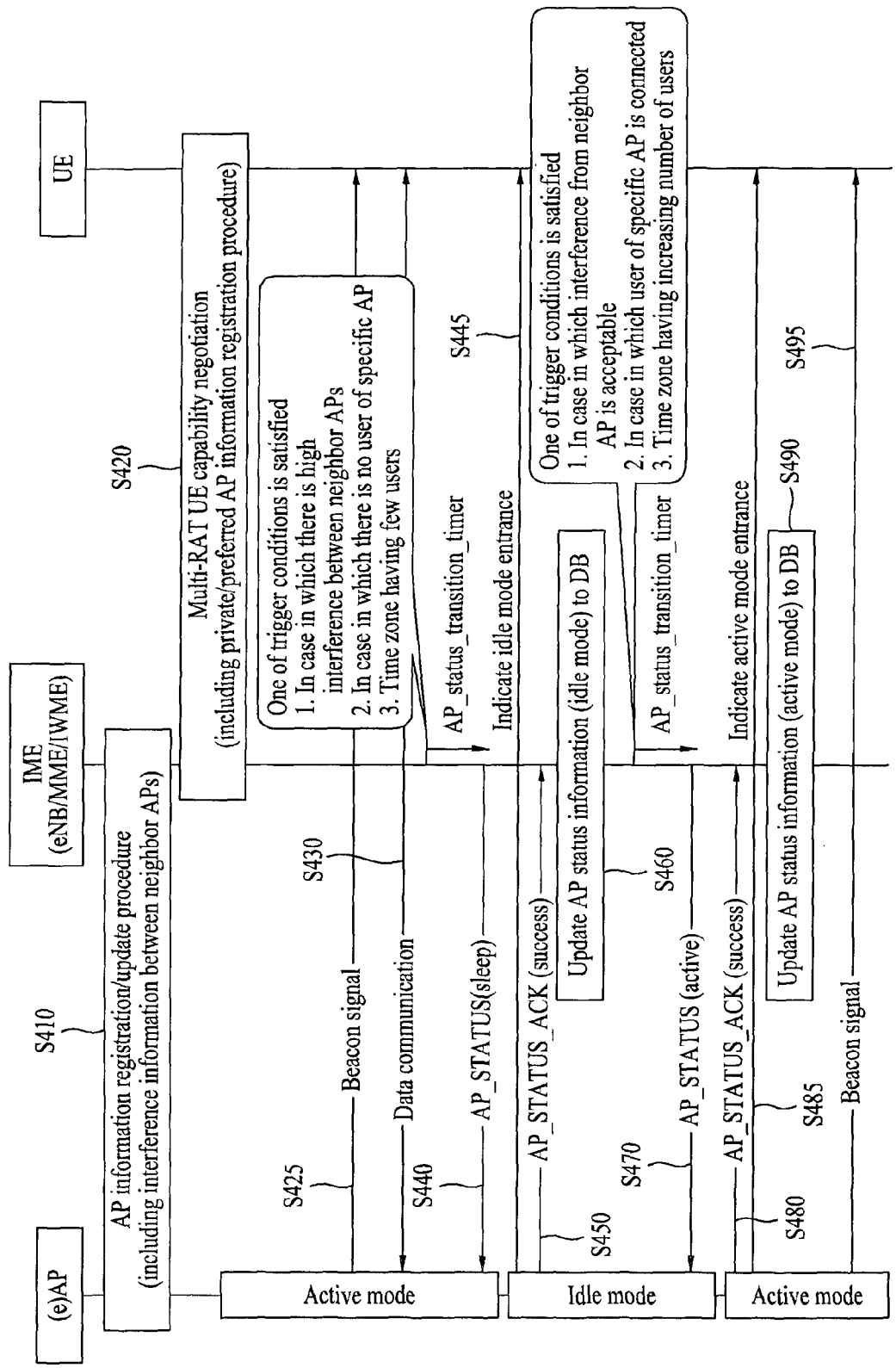
FIG. 4 is a flowchart illustrating an AP status transition procedure according to embodiments of the present invention.

FIG. 4 is a flowchart illustrating an AP status transition procedure according to embodiments of the present invention.

Referring to FIG. 4, the (e)AP may perform an AP information registration and update procedure in association with an IWE (eNB, MME, or IWWE) in step S410. In this case, the (e)AP may acquire interference information between the neighbor APs. Thereafter, the IWE (eNB, MME, or IWWE) may negotiate with the UE about Multi-RAT performance in step S420. Thereafter, the (e)AP of the active mode transmits a beacon signal to the UE in step S425, and may communicate with the UE in step S430.

If a specific triggering condition occurs in such data communication, the IWE (eNB, MME, or IWWE) may transmit an AP status message (e.g., AP_STATUS message) to the (e)AP, and may command the AP to switch to the idle mode (or sleep mode) in step S440. These specific triggering conditions are identical to those of the above-mentioned embodiment 1. In this case, the AP_STATUS message may include the following parameters.

Action code—Sleep

Action cause—high interference/no user/night time

Other parameters may be contained in an action cause. For example, in the cause of "night time", i.e., in the case of a triggering condition when a current time enters a specific time zone having few users, the IME transmits an AP_STATUS message so that the AP is turned off. On the contrary, the triggering condition may operate together with a timer.

The above-mentioned trigger condition may operate with the timer, and a detailed description thereof will hereinafter be described in detail.

In case of Trigger Condition 1 (i.e., if there is high interference between one AP and the neighbor AP) (e.g., in case of a public AP), it is assumed that the AP periodically transmits an interference measurement value between the neighbor APs to an Interworking Management Entity (e.g., eNB, MME or IWME) of the cellular network, and an IME has already recognized the corresponding information. If interference between the APs exceeds a specific value according to a policy of the cellular network, the IWE starts to operate the timer. If interference is higher than a specific value even when the timer has expired, the IWE may command a specific AP to turn off.

In case of Trigger Condition 2 (i.e., if there is no user of a specific AP) (e.g., in case of a private AP), it is assumed that an IME has already recognized information of a user (UE) who uses a specific AP managed by the IME. In this case, if all users of a specific AP pre-registered in coverage of the IME are disconnected from the IME, the IME starts to operate the timer. If there is no pre-registered specific user even when the timer has expired, the IME may command the corresponding (e)AP to turn off.

In case of Trigger Condition 3 (i.e., in case of a specific time zone having few users) (e.g., in case of a public case), if the AP is used for data traffic offloading, and if the number of users (UEs) contained in a specific coverage of the cellular network is less than a threshold value, the IME may start to operate the timer. If the number of UEs is less than a threshold value even when the timer has expired, the IME may command a specific AP to be turned off.

Irrespective of whether an idle-mode transition indication message is sent to a specific AP according to a timer operation after generation of a triggering condition, or irrespective of whether an idle-mode indication message is sent to a specific AP when a triggering condition occurs, the (e)AP having received the AP status message (e.g., AP_STATUS message) from the IWE (eNB, MME, or IWWE) switches from the active mode to the idle mode according to an action code. Thereafter, the (e)AP may inform the UE that the (e)AP has entered the idle mode through a beacon signal or a probe message in step S445. In addition, if a status of the (e)AP is switched according to an action code, an AP status confirmation message (e.g., AP_STATUS_ACK message) indicating the transition result is transmitted to the IWE (eNB, MME, or IWWE) in step S450. As a result, a status "success" or "fail" may be indicated as the action result.

The IWE (eNB, MME, or IWWE) having received the AP status confirmation message from the (e)AP may update status information (indicating an idle mode) of the (e)AP to a database (DB) in step S460.

The triggering condition (i.e., triggering condition for transition from the idle mode to the active mode) described in the above-mentioned embodiment 2 may occur in the (e)AP operating in the idle mode. In other words, according to Trigger Condition 1, if the AP that causes interference to the neighbor AP is turned off, or if the AP that causes interference to the neighbor AP is acceptable (e.g., in case of a public AP), the triggering condition may occur. According to Trigger Condition 2, if a user of a specific AP gains access to the corresponding cell (e.g., in case of a private AP), the triggering condition may occur. According to Trigger condition 3, a current time may enter a specific time zone having an increasing number of users (e.g., in case of a public AP), the triggering condition may occur. If such triggering condition occurs, the IWE (eNB, MME, or IWWE) may command a specific (e)AP to be turned on in step S470. On the contrary, the triggering condition may operate together with the timer.

The above-mentioned trigger condition may operate with the timer, and a detailed description thereof will hereinafter be described in detail.

In case of Trigger condition 1, it is assumed that the (e)AP periodically transmits an interference measurement value between the neighbor APs to an Interworking Management Entity (e.g., eNB, MME or IWME) of the cellular network, and the IME has already recognized the corresponding information. If there is no interference between the APs according to a policy of the cellular network, the IWE starts to operate the timer. If interference is acceptable even when the timer has expired, the IWE (eNB, MME, or IWME) may command a specific AP to be turned on in step S470.

In case of Trigger condition 2, it is assumed that the IWE (eNB, MME, or IWME) has already recognized information of a user (UE) who uses a specific AP managed by the IWE. If at least one user of a specific AP pre-registered in coverage of the IWE connects to the corresponding cell, the IWE (eNB, MME, or IWME) may start to operate the timer. If the pre-registered specific user continuously connects to the corresponding cell even when the timer has expired, the IWE may command the corresponding AP to be turned on in step S470.

In case of Trigger condition 3, if a current time enters a specific time zone having an increasing number of users (e.g., in case of a public case), if the AP is used for data traffic offloading, and if the number of users (UEs) contained in a specific coverage of the cellular network is equal to or higher than a threshold value, the IWE (eNB, MME, or IWME) may start to operate the timer. If the number of UEs is equal to or higher than a threshold value even when the timer has expired, the IWE (eNB, MME, or IWME) may command a specific AP to be turned on in step S470.

In this way, the IWE (eNB, MME, or IWME) transmits an AP status message (e.g., AP_STATUS message) to the (e)AP such that the (e)AP can be switched to the active mode or be turned on in step S470.

Irrespective of whether an active-mode transition indication message is sent to a specific (e)AP according to a timer operation after generation of a triggering condition, or irrespective of whether an active-mode indication message is sent to a specific AP when a triggering condition occurs, the (e)AP having received the AP status message (e.g., AP_STATUS message) from the IWE (eNB, MME, or IWWE) is switched from the idle mode to the active mode according to an action code. In addition, if a status of the (e)AP is well switched according to an action code, an AP status confirmation message (e.g., AP_STATUS_ACK message) indicating the transition result is transmitted to the IWE (eNB, MME, or IWWE) in step S480. As a result, a status "success" or "fail" may be indicated as the action result. In addition, the (e)AP may inform the UE that the (e)AP has been switched to the active mode through a beacon signal or a probe message, etc. in step S485.

The IWE (eNB, MME, or IWME) having received the AP status confirmation message from the (e)AP may update state information (e.g., idle mode) of the (e)AP to a database (DB) in step S490. The (e)AP operating in the active mode may transmit a beacon signal to the UE in step S495.

Figure 5:
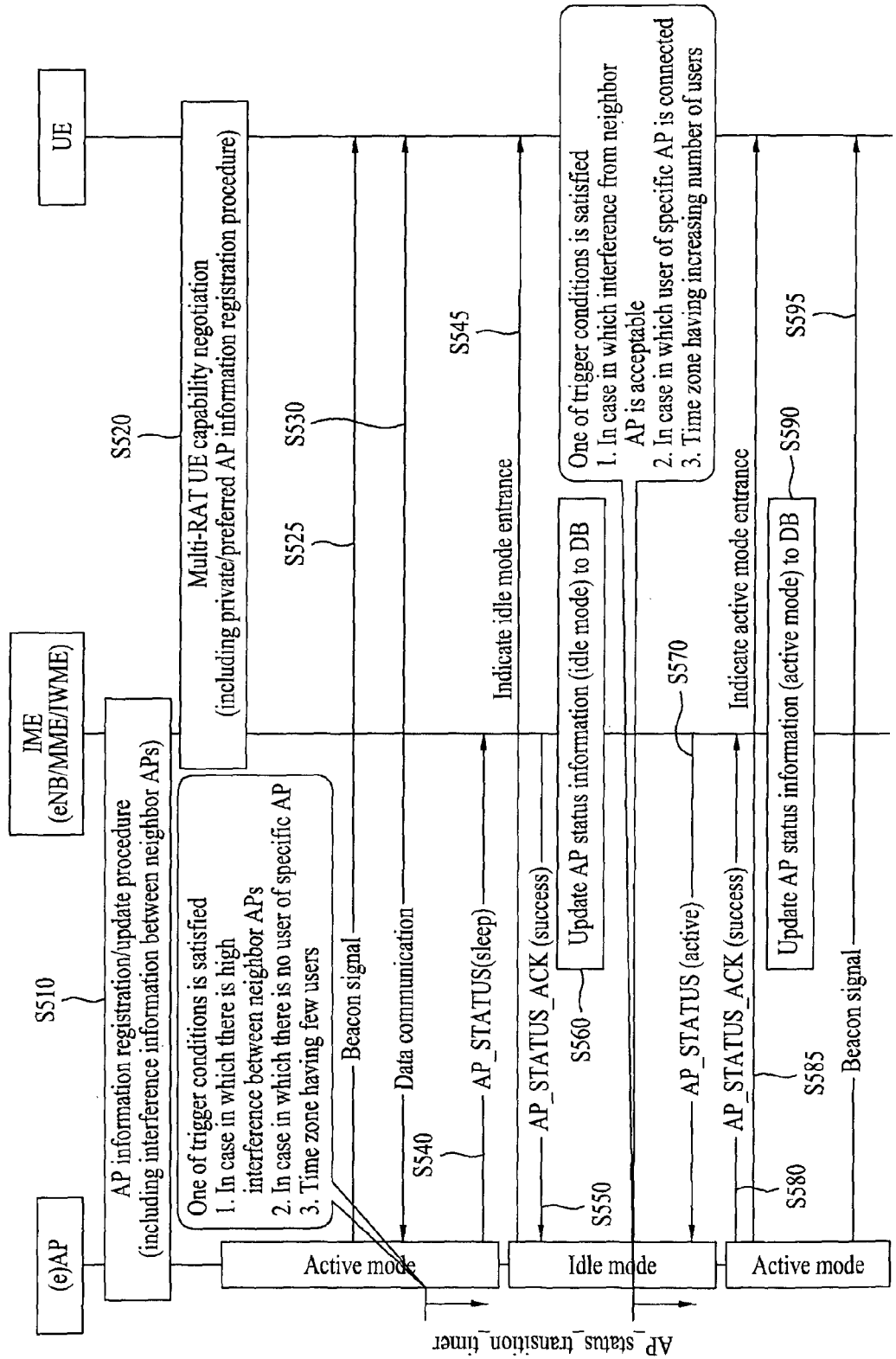
FIG. 5 is a flowchart illustrating an AP initiated AP status transition procedure according to embodiments of the present invention.

FIG. 5 is a flowchart illustrating an AP initiated AP status transition procedure according to embodiments of the present invention.

Differently from FIG. 4, the AP initiated AP status transition procedure of FIG. 5 shows that the AP transmits a message indicating an AP status message to the cellular network when the above-mentioned trigger condition is satisfied. This AP status transition procedure of FIG. 5 may be defined as some parts of the AP information update method.

Referring to FIG. 5, the (e)AP may perform an AP information registration and update procedure in association with an IWE (eNB, MME, or IWWE) in step S510. In this case, the (e)AP may acquire interference information between the neighbor APs. Thereafter, the IWE (eNB, MME, or IWWE) may negotiate with the UE about a Multi-RAT performance in step S520. Thereafter, the (e)AP of the active mode transmits a beacon signal to the UE in step S525, and may communicate with the UE in step S530.

If a specific triggering condition (i.e., a triggering condition for transition from the active mode to the idle mode) occurs in such data communication, the (e)AP may transmit an AP status message (e.g., AP_STATUS message) to the IWE (eNB, MME, or IWWE), and may command the IWE (eNB, MME, or IWWE) to be switched to the idle mode (or sleep mode) in step S540. These specific triggering conditions are identical to those of the above-mentioned embodiment 1. In this case, the AP_STATUS message may include the following parameters.

Action code—Sleep

Action cause—high interference/no user/night time

Other parameters may be contained in an action cause. For example, in the cause of "night time", i.e., in the case of a triggering condition when a current time enters a specific time zone having few users, the (e)AP transmits an AP_STATUS message to the IWE (eNB, MME, or IWME) so that the (e)AP can be turned off. On the contrary, the triggering condition may operate together with a timer.

The above-mentioned trigger condition may operate with the timer, and a detailed description thereof will hereinafter be given in detail.

In case of Trigger Condition 1 (i.e., if there is high interference between one AP and the neighbor AP) (e.g., in case of a public AP), it is assumed that the AP periodically transmits an interference measurement value between the neighbor APs to an Interworking Management Entity (e.g., eNB, MME or IWME) of the cellular network, and an IME has already recognized the corresponding information. If interference between the APs is higher than a specific value according to a policy of the cellular network, the IWE starts to operate the timer. If interference is higher than a specific value even when the timer has expired, the (e)AP may inform the IWE (eNB, MME, or IWME) that the (e)AP will be turned off.

In case of Trigger Condition 2 (i.e., if there is no user of a specific AP) (e.g., in case of a private AP), it is assumed that an IME has already recognized information of a user (UE) who uses a specific AP managed by the IME. In this case, if all users of a specific AP pre-registered in coverage of the IME are disconnected from the IME, the IME starts to operate the timer. If there is no pre-registered specific user even when the timer has expired, the (e)AP may inform the IME IWE (eNB, MME, or IWME) that the (e)AP will be turned off.

In case of Trigger Condition 3 (i.e., in case of a specific time zone having few users) (e.g., in case of a public case), if the AP is used for data traffic offloading, and if the number of users (UEs) contained in a specific coverage of the cellular network is less than a threshold value, the timer starts operation. If the number of UEs is less than a threshold value even when the timer has expired, the (e)AP may inform the IWE (eNB, MME, or IWME) that the (e)AP will be turned off.

Irrespective of whether an idle-mode transition indication message is sent to an IWE (eNB, MME, or IWME) according to a timer operation after generation of a triggering condition, or irrespective of whether an idle-mode indication message is sent to the IWE (eNB, MME, or IWME) when a triggering condition occurs, the (e)AP is switched from the active mode to the idle mode according to an action code. Thereafter, the (e)AP may inform the UE that the (e)AP has entered the idle mode through a beacon signal or a probe message in step S545.

In addition, the IWE (eNB, MME, or IWME) may transmit an AP status confirmation message (e.g., AP_STATUS_ACK message) to the (e)AP in response to an AP status message (AP_STATUS message) in step S550. Thereafter, the IWE (eNB, MME, or IWME) may update status information (i.e., idle mode) of the (e)AP to the database (DB) in step S560.

The triggering condition (i.e., triggering condition for transition from the idle mode to the active mode) described in the above-mentioned embodiment 2 may occur in the (e)AP operating in the idle mode. In other words, according to Trigger Condition 1, if the AP that causes interference to the neighbor AP is turned off, or if the AP that causes interference to the neighbor AP is acceptable (e.g., in case of a public AP), the triggering condition may occur. According to Trigger Condition 2, if a user of a specific AP gains access to the corresponding cell (e.g., in case of a private AP), the triggering condition may occur. According to Trigger condition 3, a current time may enter a specific time zone having an increasing number of users (e.g., in case of a public AP), the triggering condition may occur. If such triggering condition occurs, the (e)AP may inform the IWE (eNB, MME, or IWWE) that the (e)AP will be turned on in step S570. On the contrary, the triggering condition may operate together with the timer.

The above-mentioned trigger condition may operate with the timer, and a detailed description thereof will hereinafter be given in detail.

In case of Trigger condition 1, it is assumed that the (e)AP periodically transmits an interference measurement value between the neighbor APs to an Interworking Management Entity (e.g., eNB, MME or IWME) of the cellular network, and the IME has already recognized the corresponding information. If there is no interference between the APs according to a policy of the cellular network, the IWE starts to operate the timer. If interference is acceptable even when the timer has expired, the (e)AP may inform the IWE (eNB, MME, or IWME) that the (e)AP will be turned on in step S570.

In case of Trigger condition 2, if at least one (e)AP is connected, the timer starts operation. If the pre-registered specific user continuously connects to the corresponding cell even when the timer has expired, the (e)AP may inform the IWE (eNB, MME, or IWME) that the (e)AP will be turned on in step S570.

In case of Trigger condition 3, if a current time enters a specific time zone having an increasing number of users (e.g., in case of a public case), if the AP is used for data traffic offloading, and if the number of users (UEs) contained in a specific coverage of the cellular network is equal to or higher than a threshold value, the timer starts operation. If the number of UEs is equal to or higher than a threshold value even when the timer has expired, the (e)AP may inform the IWE (eNB, MME, or IWME) that the (e)AP will be turned on in step S570.

In this way, the AP transmits an AP status message (e.g., AP_STATUS message) to the IWE (eNB, MME, or IWME) such that the AP can be switched to the active mode or be turned on in step S570.

Irrespective of whether an active-mode transition indication message is sent to a specific (e)AP according to a timer operation after generation of a triggering condition, or irrespective of whether an active-mode indication message is sent to the IWE (eNB, MME, or IWME) when a triggering condition occurs, the (e)AP is switched from the idle mode to the active mode according to an action code. In addition, the (e)AP may receive the AP status confirmation message (e.g., AP_STATUS_ACK message) from the IWE (eNB, MME, or IWME) in step S580. In addition, the (e)AP may inform the UE that the (e)AP has been switched to the active mode through a beacon signal or a probe message, etc. in step S585.

Thereafter, the IWE (eNB, MME, or IWME) may update status information (i.e., idle mode) of the (e)AP to a database (DB) in step S590. The (e)AP operating in the active mode may transmit a beacon signal to the UE in step S595.

As described above, according to exemplary embodiments of the present invention, the UE can efficiently use a WLAN through control of a cellular network in a broadband wireless communication system, the exemplary embodiments can minimize power consumption of an Access Point (AP) having a cellular link or can minimize interference between APs, resulting in improved communication throughput.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes within the equivalent scope of the invention are within the scope of the invention.

[Mode for Invention]

Various embodiments have been described in the best mode for carrying out the invention.

INDUSTRIAL APPLICABILITY

As is apparent from the above description, in order to efficiently use a WLAN by a user equipment (UE) through control of a cellular network in a broadband wireless communication system, exemplary embodiments of the present invention provide a method for minimizing power consumption of an Access Point (AP) having a cellular link or minimizing interference between APs, resulting in improved communication throughput.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for supporting state mode transition by an entity of a cellular network in case that a plurality of networks interwork, the method comprising:
when a value of interference caused by a neighbor entity of a wireless local area network (WLAN) is equal to or larger than a predefined threshold value, transmitting, to another entity of the WLAN, a first message instructing the another entity of the WLAN to perform a mode transition from an active mode to an idle mode;
in response to the first message, receiving, from the another entity of the WLAN, a second message including information indicating whether status of the mode transition of the another entity of the WLAN is successful; and
when the information indicates that the status of the mode transition of the another entity of the WLAN is successful, updating status information of the another entity of the WLAN based on the second message.

2. The method according to claim 1, further comprising:
when the value of interference caused by the neighbor entity of the WLAN is smaller than the predefined threshold value, transmitting, to the another entity of the WLAN, a third message instructing the another entity of the WLAN to perform a mode transition from the idle mode to the active mode.

3. The method according to claim 1, wherein the entity of the cellular network is a base station (BS), a Mobility Management Entity (MME), or an Interworking Management Entity (IWME).

4. The method according to claim 1, wherein the another entity of the WLAN is an access point (AP).

5. The method according to claim 2, wherein the third message includes a power value, the power value being used when the another entity of the WLAN transits to the active mode.

6. An apparatus of a cellular network configured to support state mode transition in a case that of a plurality of networks interwork, the apparatus comprising:
a transmitter,
wherein, when a value of interference caused by a neighbor entity of a wireless local area network (WLAN) is equal to or larger than a predefined threshold value, the transmitter transmits a first message to another entity of the WLAN, the first message instructing the second entity of the WLAN to perform a mode transition from an active mode to an idle mode;
a receiver,
wherein, in response to the first message, the receiver receives a second message from the another entity of the WLAN, the second message including information indicating whether status of the mode transition of the another entity of the WLAN is successful; and
a processor,
wherein, if the information indicates that the status of the mode transition of the another entity of the WLAN is successful, the processor updates status information of the another entity of the WLAN based on the second message.

7. The apparatus according to claim 6, wherein, when the value of interference caused by the neighbor entity of the WLAN is smaller than the predefined threshold value, the transmitter transmits, to the another entity of the WLAN, a third message instructing the another entity of the WLAN to perform a mode transition from the idle mode to the active mode.

* * * * *